A. G. BUMGARDNER.
RACK.
APPLICATION FILED FEB. 18, 1921.

1,395,989.

Patented Nov. 1, 1921.
3 SHEETS—SHEET 1.

Inventor
A. G. Bumgardner,
By William C. Linton
Attorney

A. G. BUMGARDNER.
RACK.
APPLICATION FILED FEB. 18, 1921.
1,395,989.
Patented Nov. 1, 1921.
3 SHEETS—SHEET 2.
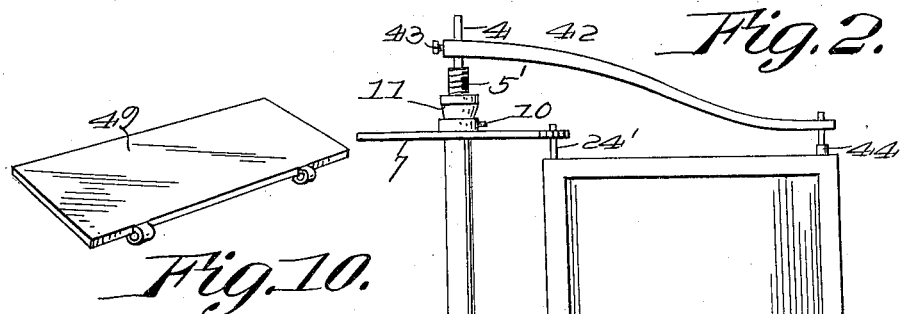
Fig. 10.
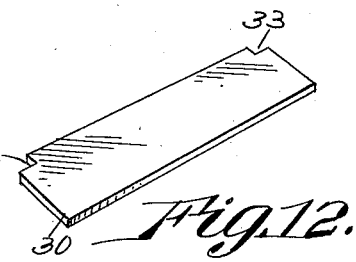
Fig. 11.
Fig. 12.
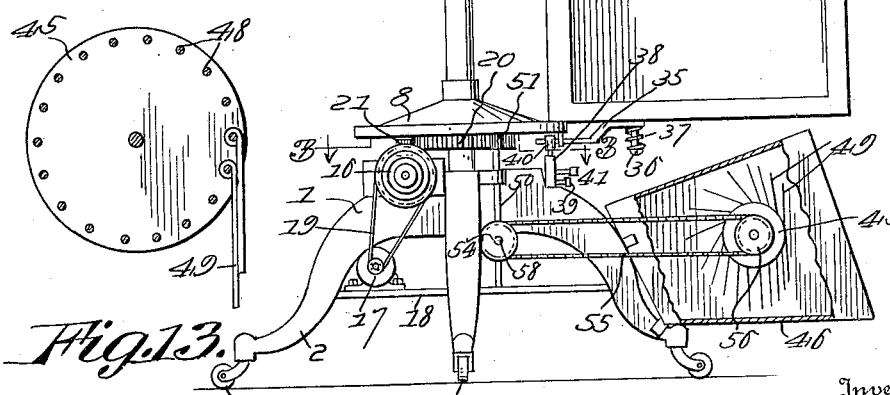
Fig. 13.
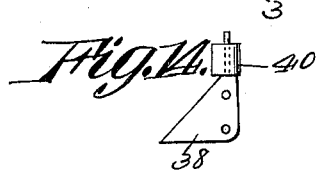
Fig. 14.
Fig. 2.
Inventor
A. G. Bumgardner,
By William C. Linton,
Attorney A. G. BUMGARDNER.
RACK.
APPLICATION FILED FEB. 18, 1921.
1,395,989.
Patented Nov. 1, 1921.
3 SHEETS—SHEET 3.
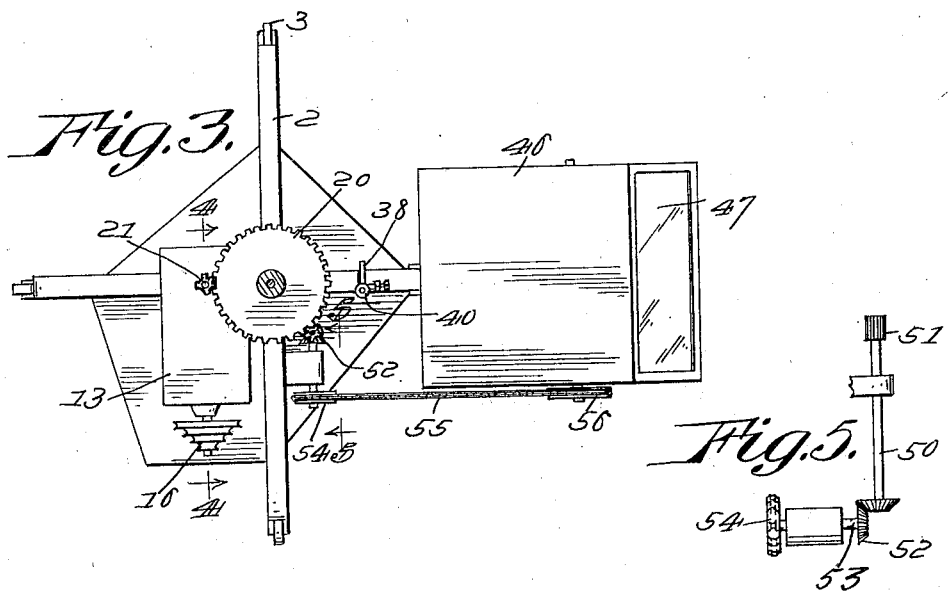
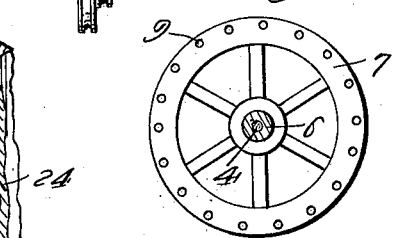
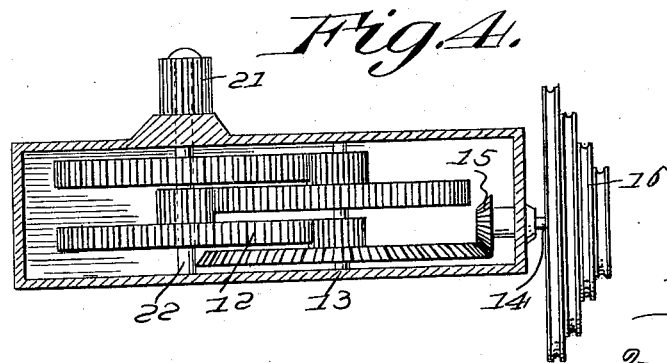
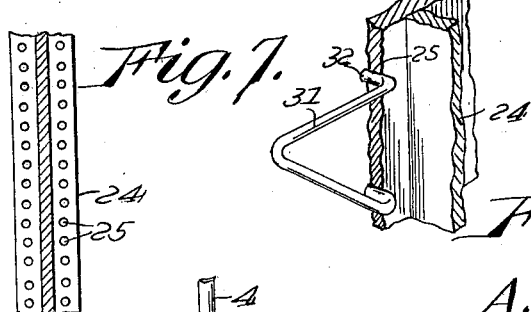
Inventor
A. G. Bumgardner,
By William C. Linton,
Attorney

UNITED STATES PATENT OFFICE.

ADAM GIDEON BUMGARDNER, OF CLARKSBURG, WEST VIRGINIA.

RACK.

1,395,989.                Specification of Letters Patent.          Patented Nov. 1, 1921.

Application filed February 18, 1921. Serial No. 446,102.

*To all whom it may concern:*

Be it known that I, ADAM GIDEON BUMGARDNER, a citizen of the United States, and a resident of Clarksburg, in the county of Harrison and State of West Virginia, have invented certain new and useful Improvements in Racks; and I do hereby declare that the following is a full, clear, and exact description of the invention, such as will enable others skilled in the art to which it appertains to make and use the same.

This invention has reference to improvements in display devices, having for an object to provide a rotary display stand employing a plurality of display elements which, during their orbital path of travel, are caused to be automatically turned or reversed in position, whereby to fully display the articles or goods supported thereon.

Another and equally important object of the invention is to provide a display stand of the character mentioned which can be caused to rotate at variable speeds in order that the same may be regulated for displaying certain articles or goods for periods of time dependent upon the time required to effectually display the same.

Yet another object of the invention may be stated to reside in the provision of means for effecting the reversing or changing of position of each of the display elements at predetermined points during their orbital paths of travel.

Other objects will be in part obvious and in part pointed out hereinafter.

In order that the invention and its mode of operation may be readily understood by persons skilled in the art, I have in the accompanying drawings, and in the detailed following description based thereon, set out certain embodiments of the same.

In these drawings,

Fig. 2 is an elevation of the stand with but one of the display elements arranged thereon, a portion of the stand being broken away and shown in section;

Fig. 3 is a horizontal section taken on the line 3—3 of Fig. 2 looking in the direction in which the arrows point;

Fig. 4 is a detail in section taken on the line 4—4 of Fig. 3 looking in the direction in which the arrows point;

Fig. 5 is a similar view taken on the line 5—5 of Fig. 3 looking in the direction in which the arrows point;

Fig. 6 is a detail in section showing the upper circular supporting bracket of the display stand;

Fig. 7 is a fragmentary detail in section illustrating one side of the supporting element;

Fig. 8 is a fragmentary detail in perspective illustrating the engagement of a shelf-supporting bracket with a portion of one of the display elements;

Fig. 9 is a fragmentary detail in elevation of a portion of the supporting rod;

Fig. 10 is a detail in perspective of one of the display leaves employed in connection with the stand;

Fig. 11 is a detail of one of the hook-supporting bars;

Fig. 12 is a detail in perspective of the type of shelf employed in connection with the bracket shown in Fig. 8;

Fig. 13 is a vertical section taken through the leaf-displaying drum of the stand, and Fig. 14 is a detail in elevation of the trip employed for reversing the positioning of each of the various display elements during their travel.

Figure 1:
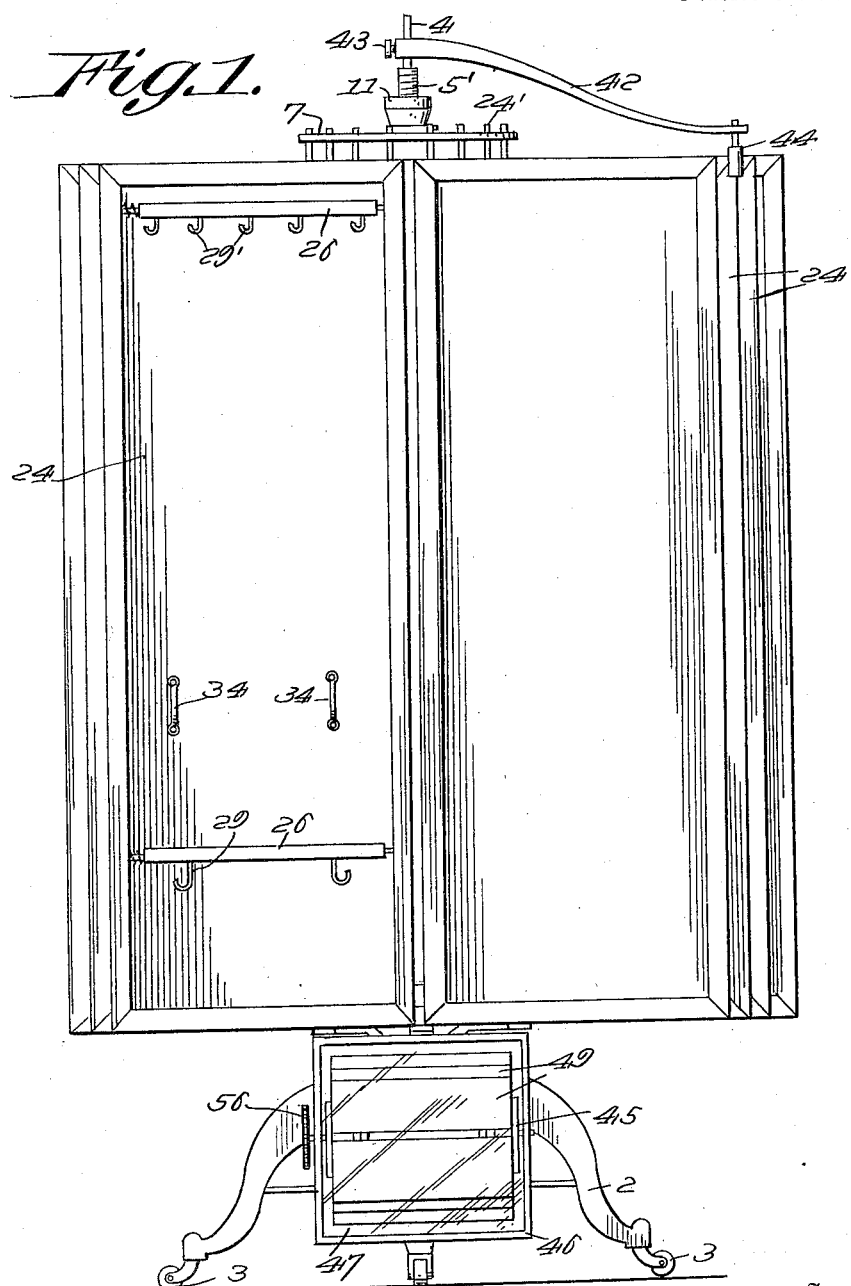
Figure 1 is a front elevation of my improved display stand showing the relative positions of certain of the display elements thereon when in displaying positions.

Having more particular reference to the drawings, in connection with which like characters of reference will designate corresponding parts throughout the several views, my improved stand comprises a main support or pedestal indicated by the numeral 1 and consisting of a plurality of radially disposed reversely curved supporting legs 2 preferably having casters 3 engaged with the feet thereof, for an obvious purpose. A centrally located socket is arranged in the pedestal 1 and receives therein the lower end of a vertical supporting rod 4 having a shoulder 5 arranged on the lower portion thereof and engageable over the mouth of said socket for an obvious purpose, the upper end of said rod being reduced while a portion of the same is screw-threaded as at 5'.

Slidably engaged over the supporting rod 4 is a hollow column 6 carrying on its opposite extremities circular brackets 7 and 8, which brackets, as will be noted, are each provided adjacent their marginal portions with a series of circularly arranged bearing openings 9, as shown in the bracket 7 illustrated by the Fig. 6. Set screws 10 or other suitable locking devices are provided the several brackets 7 and 8 and, as will be understood, are adapted to be engaged with adjacent portions of the hollow column 6 whereby to lock their respective disks with relation to the same. To prevent material vertical movement of the column 6 with respect to the supporting rod 4, a frusto conical nut 11 is turned into engagement with the screw-threaded portion 5 of said rod 4 and has bearing upon the central portion of the upper disk 7, which is locked or connected to this column 6 through the medium of a set screw 10.

With a view toward providing means for transmitting rotary motion to the carrier constituted by the hollow drum 6 and its several circular brackets 7 and 8, power transmission gearing generally indicated by the numeral 12 is supported in a housing 13 secured upon the upper side of the pedestal 1, said gearing being provided with a driving shaft 14 which meshes with the first of the gears constituting the power transmission train through the medium of a beveled gear 15, and carrying on its outer end a graded pulley wheel 16, that is, a pulley wheel consisting of a number of successively stepped sections arranged in juxtaposed position as clearly shown in the Fig. 4. A motor 17 or other suitable source of power is arranged upon a bracket 18 carried by the pedestal 1 and receives about the drive pulley of the armature shaft thereof an endless belt 19 which, as shown in the Fig. 2, has its opposite end passed about one of the sections of the graded pulley 16. Thus, with energization of the motor 17, it is apparent that rotary motion will be transmitted to the pulley 16 and from thence, by way of the transmission train of gearing, to the carrier which has a disk gear 20 secured to the lower end of its column 6 and meshes with a pinion 21 carried on the vertically extended driven shaft 22 of the power transmission gearing.

Display elements comprising substantially rectangular panels generally indicated by the numeral 24 are provided and consist of frames of wood or other suitable material carrying oppositely disposed bearing pins 24' on the upper and lower ends of the same, preferably in proximity to their inner sides. These bearing pins 24' are receivable in the corresponding bearing openings 9 of the circular brackets 7 and 8 and so serve to pivotally support the display elements in substantially vertical planes and in spaced relation to each other. As will be noted, the frames of each of the panels 24 are extended laterally beyond the opposite sides of the bodies thereof, as indicated in the Fig. 7, and in these extended portions of the frames I form a plurality of vertically disposed recesses or pockets 25 adapted to provide means for permitting the connection of various supporting devices, certain of which are hereinafter described therein.

Inasmuch as my improved display stand is intended to display articles or goods of various kinds, it is preferable that I provide the same with different types of means for supporting such articles or goods in displaying positions upon the various panels 24, and in this connection, I may employ supporting bars such as shown in the Fig. 11 and indicated by the numeral 26, this particular type of bar having reduced bearing pins on its opposite ends, one of which is longer than the other and has an expansible coil spring 28 disposed thereabout in order that when said bar 26 is engaged with the opposite sides of the panel frame, it will be prevented from having undue lateral movement or rattling. A plurality of hooks 29 are engaged with the bar 26 throughout its length and obviously, afford means for permitting the attaching of things to be displaced thereon. Different types of hooks may of course be employed, dependent upon the type of articles to be displayed thereby, illustration of this variation being clearly shown in the Fig. 1, wherein smaller hooks 29' are engaged with the uppermost bar 26.

Instead of employing the bars 26 I may also provide the various panels 24 with superposed shelves 30; engaging such shelves with bracket arms 31 having inwardly disposed lateral pintles 32 on the extremities thereof adapted for engagement in certain of the openings 25 of the frame of the panel receiving the shelves. In order that these shelves will have snug engagement with their respective panels 24, I may and preferably do form seats 33 adjacent the inner corners thereof, which seats, as will be noted, engage over the corresponding corner portions of the opposite sides of the particular panel receiving the same. Thus, lateral displacement of the shelves with relation to the panel will be prevented.

As a further illustration of the various types of means for supporting articles or goods upon the panels 24, I have shown the types of brackets as illustrated at 34 in the Fig. 1, these brackets consisting merely of curved pieces of metal or other material having eyelets formed in their opposite ends for receiving attaching devices such as screws, rivets or the like therein, whereby they may be securely affixed to the desired portions of the panel body.

From the foregoing it will be understood that with the transmission of rotary motion from the gearing 12 to the carrier, said carrier will be caused to rotate, and by consequence, the various vertical panels 24 will assume an orbital path of travel about the supporting rod 4. It is desirable in this connection that means be provided for causing the opposite sides of the various panels, carrying different types or classes of articles and goods thereon, to be displayed to the public or prospective purchasers; and to accomplish this result, I arrange on the undersides of each of the frames of the various panels 24 at points in proximity to their inner sides, arms 35 which, as will be noted, are affixed intermediate their lengths and are detachably secured to said portions of the panels by means of screws or similar devices 36 having expansible coil springs 37 engaged thereover and bearing on the outer ends of said arms, as shown in the Fig. 2, while the inner ends of these arms are extended for distances inwardly of the lower circular bracket 8. A vertically disposed trip 38 is pivoted at 39 to a portion of the pedestal 1 and carries on its upper end a bearing roller 40 which is adapted to be engaged by the inwardly extended ends of the various arms 35 during movement of the panels 24 in their orbital path about the supporting rod 4. The trip 38 may be and preferably is locked in its operative or vertical position by means of the locking pin 41, which, as shown in the Figs. 2 and 14, passes through a suitable opening in the upper portion thereof into engagement with an adjacent part of the pedestal 1. Obviously, by disengaging this pin 41 from the pedestal 1, the trip 38 may be swung downwardly to an inoperative position and the arms 35 thus permitted to pass idly thereby. As additional means for simultaneously displaying the articles or goods carried on certain sides of two of the panels 24, a laterally extending arm 42 is engaged with the upper end of the supporting rod 4 and rendered immovable with relation thereto by means of a locking screw 43; the outer end of said arm 42 carrying a depending checking roller 44 which is adapted to be engaged, successively, with the upper portions of each of the panels 24 during their travel.

In addition to the display means constituted by the panels, I may and preferably do provide secondary display means consisting of a horizontal drum 45 having bearing at its opposite extremity in the side walls of the housing 46 secured in a suitable manner to the pedestal 1, the front end of which is preferably closed by a transparent cover 47. Loosely secured on rods 48 carried between the several disks of the drum 45, are leaves 49 which may have various forms of advertising matter printed or otherwise presented on the outer faces thereof so that as the drum rotates these leaves with their respective advertising matter will be successively displayed.

To effect rotation of the horizontal drum 45, a vertical shaft 50 is supported in bearings of the pedestal 1 and carries a pinion 51 on its upper end meshing with the disk gear 20, while the lower end of said shaft is interconnected by beveled gearing 52 with the inner end of a horizontal shaft 53, also mounted in said pedestal 1 and carrying a pulley 54 on its outer end about which an endless belt 55 is arranged in order that rotary motion will be transmitted to a second pulley 56 mounted adjacent one end of the drum 45 exteriorly of the housing 46.

In operation and assuming that various articles or goods are supported upon the opposite sides of the various panels 24, the motor 17 is started, thus transmitting rotary motion to the carrier. At this time the panels 24 will be caused to move in an orbital path about the supporting rod 4 and at a predetermined point, the outer portions of each thereof will be engaged by the check roller 45, as shown in the Fig. 1, thus checking movement of the outer portion of each panel so engaged until said panel is completely carried thereby with continued rotation of the carrier. At the same time, the panel 24 preceding the panel now engaged by the checking roller 44 will have moved to a position whereat the arm 35 carried on the lower end thereof will contact with the bearing roller 40 of the trip 38. By reason of this contact and of the continued orbital path of movement of said panel, that side of the same which was first displayed during engagement with the checking roller 44 will be moved to a reversed position, that is, the panel will be swung completely around, as shown in the Fig. 1, whereby to fully display the articles or goods carried on the opposite side. In this way, it will be understood that the goods carried on certain sides of several of the panels 24 will be simultaneously displayed, the time for such display of articles or goods being, obviously, dependent upon the speed at which the carrier is rotated. Simultaneously with display of the panels or display elements 24, rotary motion is being transmitted to the horizontal drum 45 with its loosely supported leaves 49, thereby successively displaying the same through the transparent cover 47.

The number of display elements or panels 24 supported on the carrier constituted by the hollow column 6 and circular brackets 7 and 8 may of course be readily varied, as, for instance, every intermediate panel may be removed from the circular brackets when the goods to be supported on the remaining panels are of a bulky nature. Such removal of the panels is effected by turning the detachably secured arm 35 and then lifting the panel 24 high enough to permit the pin 24′ on the lower part of the panel 24 to be released from bracket 8. It is obvious that since the pin 24′ supported by bracket 7 is longer than the pin in hole 9 of bracket 8, said panel 24 may be easily and instantly removed.

The nut 11 serves to keep the column 6 from rubbing against the fixedly supported rod 4 by suitable anti-frictional bearings at the top and bottom of the column 6.

It may also be noted at this point that the panels 24 may be employed to serve as supports or backings for pictures, advertising matter, different samples of wall paper, or various other articles, goods or material which cannot be supported on the hooks or brackets hereinbefore described, but by reason of their nature must be pasted or otherwise affixed in their displaying positions. As illustration, the pictures or other matter to be displayed directly on the panels may have a suitable adhesive applied thereto for affixing directly to the panels.

Manifestly, the construction shown is capable of considerable modification, and such modification as is within the scope of my claims I consider within the spirit of my invention.

I claim:

1. A display member including a supporting pedestal equipped with a plurality of pivotally mounted display panels, means carried by the top of the pedestal and having a portion thereof extended to lie in the path of movement of the panels for rotating the latter on their axes, and means carried by the bottom of the pedestal and in connection with the lower ends of the panels to rotate the latter on their axes in a direction counter to that caused by the first said means.

2. A display member including a supporting pedestal equipped with a plurality of pivotally mounted display panels, means carried by the top of the pedestal and having a portion thereof extended to lie in the path of movement of the panels for rotating the latter on their axes, trip means carried by the bottom of the pedestal and in connection with the lower ends of the panels to rotate the latter on their axes in a direction counter to that caused by the first said means, and a locking member for said trip means to hold the latter in an operative position, said member being removable to render the trip means ineffective.

3. A display stand comprising a pedestal, a vertically rotatable carrier on the pedestal, variable speed power transmission gearing connected to said rotatable carrier, a plurality of panels pivoted in circular relation about the carrier, an immovable lateral arm connected to said pedestal having checking means on its free end engageable with portions of said panels during their rotary movement for causing the same to assume positions whereby certain of the sides of each thereof will be successively displayed, a trip on the pedestal, arms on each of said panels engageable with said trip subsequent to their engagement with said checking means whereby to reverse their respective positions during continued rotary movement.

In witness whereof I have hereunto set my hand.

ADAM GIDEON BUMGARDNER.